(No Model.)
P. UNSINGER.
SCRAPER.
No. 499,060. Patented June 6, 1893.
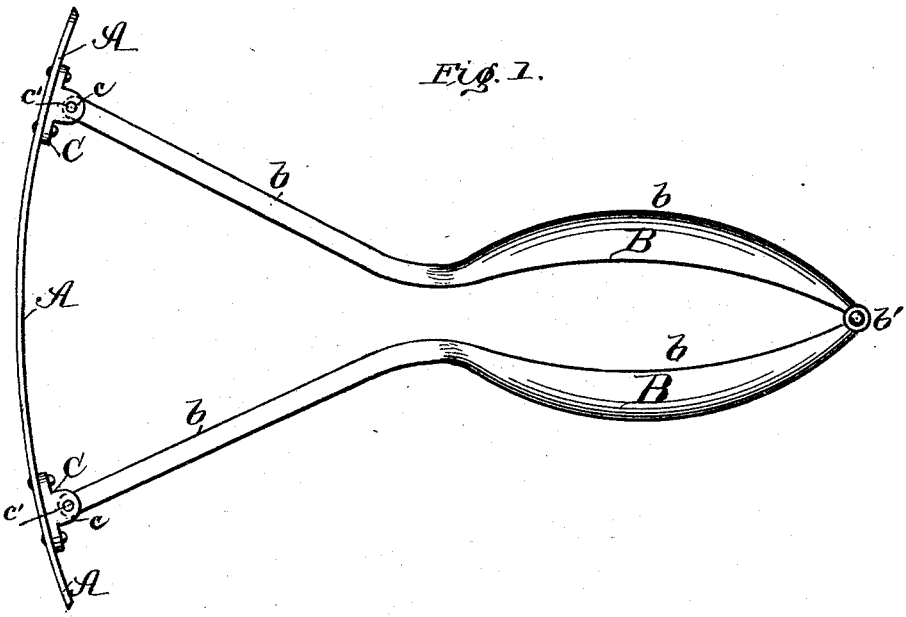
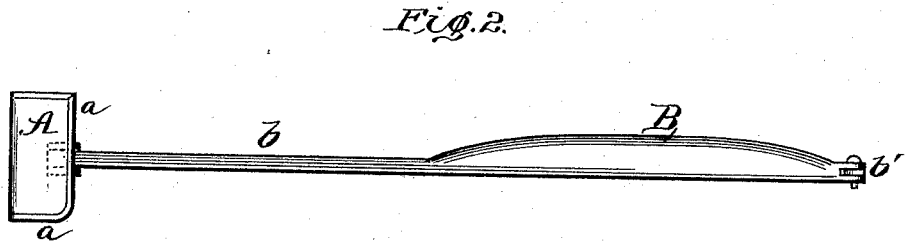
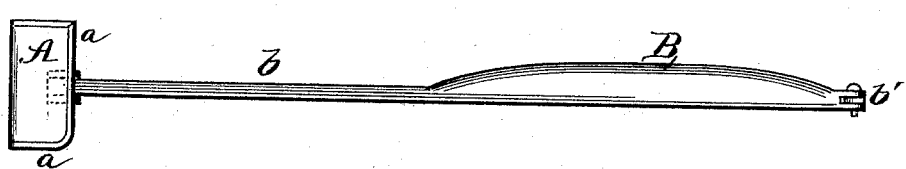
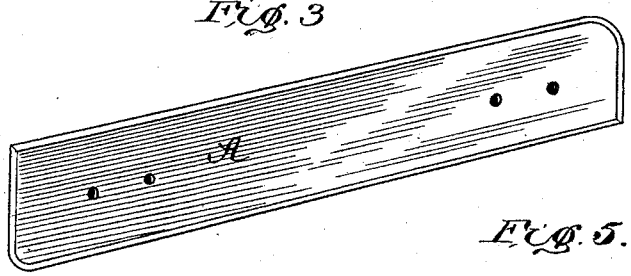
WITNESSES:
Fred G. Dieterich
H. J. Robinson
INVENTOR
Peter Unsinger.
BY Munn & Co
ATTORNEYS.

UNITED STATES PATENT OFFICE.

PETER UNSINGER, OF FREMONT, OHIO, ASSIGNOR TO THE UNSINGER MANUFACTURING COMPANY, OF SAME PLACE.

SCRAPER.

SPECIFICATION forming part of Letters Patent No. 499,060, dated June 6, 1893.

Application filed December 9, 1892. Serial No. 454,584. (No model.)

*To all whom it may concern:*

Be it known that I, PETER UNSINGER, of Fremont, in the county of Sandusky and State of Ohio, have invented a new and useful Improvement in Scrapers, of which the following is a specification.

This invention is an improved flexible scraper for pots, kettles, metallic sinks and the like, the device being used to scrape the grease and dirt from the sides, bottom and corners of the pot or kettle, and the object of my invention is to provide a cheap and simple scraper that will readily conform to the sides of the pot or kettle, and one that can go into the sharp corners and effectually clean them.

With this object in view my invention consists in the peculiar construction of the separate elements and also in the novel manner of combining the same, all of which will be fully explained hereinafter and pointed out in the claims.

In the drawings forming a part of this specification, Figure 1 is a top plan view of my improved scraper. Fig. 2 is a side view of the same. Fig. 3 is a detail view of the scraper blade. Fig. 4 is a detail view of the connection between the blade and handle, and Fig. 5 is a detail view of the connection between the handle sections.

In carrying out my invention I employ a thin steel scraper plate A, the upper and lower edges of which are beveled as shown at $a$, and two diagonally opposite corners are rounded, the curve of one corner being much sharper than the other. The scraper is thus provided with two square corners and two varying rounded corners the object of such construction being to enable one to scrape into all the lower corners, both curved and square. The blade being very thin and of steel will readily conform to the sides or bottom of the pot or kettle.

B indicates the handle attached to the scraper blade, said handle consisting of two halves or sections $b$ hinged together at $b'$, the opposite ends of the said halves being pivotally connected to the ends of the scraper blade. In order to so connect the blade and handle, I provide the hinge plates C C said plates being secured to the blade near the ends of the same said hinge plate being formed with the parallel apertured lugs $c\ c$ between which the ends of the halves $b$ rest and said ends are secured between the lugs by means of the pintles $c'\ c'$, thus establishing a pivotal connection between the handle and blade. By this means the blade is allowed to conform more readily to the shape of the sides or bottom. The hinge $b'$ at the end of the handle sections also permits a limited movement between the sections as the blade straightens or bends and this construction also contributes to the efficiency of the scraper blade. It will thus be seen that I provide a very cheap, simple, and durable scraper, one that consists of very few parts, one in which there is perfect movement between the parts, one which will readily conform itself to the sides and bottom of the pot, and one that can be forced into all the corners both round and square.

Having thus described my invention, what I claim as new, and desire to secure by Letters Patent, is—

1. In a pot scraper the combination with a steel blade, of a handle formed in two parts, each part being pivotally connected at its forward end to the blade, and pivotally connected with each other at their rear ends, substantially as shown and described.

2. The combination with the handle sections hinged together of the scraper blade, the hinge plates connected thereto and the pintles connecting the hinge plate and handle sections substantially as shown and described.

3. The combination with a thin flat blade, having round and square corners of the hinge plates secured near the ends of said plate, the handle composed of two sections hinged together at one end, the opposite end of each section being secured to the hinge plate substantially as and for the purpose described.

PETER UNSINGER.

Witnesses:
CHARLES RORER,
JOSEPH KINELLE.